Oct. 20, 1970     W. MECKLENBURG ET AL     3,535,596
ELECTROMAGNETIC RELAY APPARATUS
Filed April 28, 1967
2 Sheets-Sheet 1

United States Patent Office 3,535,596
Patented Oct. 20, 1970

3,535,596
ELECTROMAGNETIC RELAY APPARATUS
Wolfgang Mecklenburg, Rudolf Nitsch, Korbinian Karrer and Manfred Adler, Munich, Germany, assignors to Siemens Aktiengesellschaft, Berlin and Munich, Germany
Filed Apr. 28, 1967, Ser. No. 634,664
Claims priority, application Germany, Apr. 29, 1966, S 103,543
Int. Cl. H01h *47/04*
U.S. Cl. 317—154  4 Claims

ABSTRACT OF THE DISCLOSURE

An electromagnetically actuated relay structure, wherein magnetic energy is effectively stored so as to complete actuation of the relay upon disconnection of the magnetic energization means, which initiates relay actuation. An electromagnetic exciter winding is wound around a core structure, and a current source applies energization pulses that energize the exciter winding and induce currents in said core structure, which are operable upon disconnection of the currrent source to maintain a magnetic field that is of sufficient strength to complete actuation of the armature to the desired position.

CROSS REFERENCE TO RELATED APPLICATION

Applicant claims priority from German patent application Ser. No. 103,543, filed Apr. 29, 1966, in Germany.

BACKGROUND OF THE INVENTION

Field of the invention

The invention concerns a relay structure which comprises an armature, that may be operated between at least two positions, as determined by electromagnetic means. The energization pulses applied to the exciter winding of the electromagnetic relay induce currents in magnetic energy storage means associated therewith. Energization of the exciter winding by energization pulses produces a magnetic field that initiates armature actuation, which is completed by the stored magnetic energy upon termination of said energization pulses. The magnetic energy storage means enhances the efficiency of the relay, which is actuated in response to a relatively low amplitude, short time duration, exciter winding energization pulse.

DESCRIPTION OF THE PRIOR ART

Ferrite relay structures are well known in the prior art. These essentially comprise two permanent magnets, at least one of which is repolarizable between bistable magnetization states in response to control energization pulses applied to an associated exciter winding. Relatively high currents must be applied to the exciter winding to control the associated relay, which necessitates the utilization of rather large relay having high current carrying capacity elements. The use of relatively large exciter currents decreases the useable life of the relay, and increases the reaction time thereof.

SUMMARY OF THE INVENTION

These and other defects of prior art relay structures are solved by this invention, wherein a relay structure is disclosed which utilizes relatively low exciter currents and a corresponding decrease in the size of various elements comprising the relay structure. Further, the number of elements comprising the relay structure is substantially reduced, and the reaction time is markedly increased.

Thus, the exciter winding is wound around a core of magnetizable material, such as iron. The magnetic field produced by energization of the exciter winding, induces eddy currents in the magnetizable core that effectively store magnetic energy therein. Upon deenergization of the exciter winding, said eddy currents tend to oppose the collapse of the magnetic field and thus maintain a magnetic field which is additive to the magnetic field of a permanent magnet, to produce a net magnetic field of sufficient strength to continue actuation of the armature. Thus, the exciter winding is energized for a time sufficient to develop an electromagnetic field that initiates actuation of the armature. It is deenergized before the armature is completely actuated to the desired position. Thus, the eddy currents in the magnetizable core maintain a magnetic field in combination with the permanent magnet to continue actuation of the armature. Armature actuation may be completed thereby, or by the permanent magnet alone.

It is thus seen that the described relay structure comprises a minimum number of magnetic elements, thereby substantially reducing space and cost requirements. Further, it is not necessary to use any permanent magnets, although in one embodiment of the invention, one permanent magnet may be used if desired. Also, the energization currents applied to the exciter winding is relatively small. Therefore, the currrent carrying capacity of the various relay elements such as the exciter windings may be substantially reduced; correspondingly said elements may be substantially reduced in size, thereby increasing the switching rate. Further, since said elements carry current for only a portion of the time it takes to completely actuate the armature, their functional life is extended considerably.

DETAILED DESCRIPTION OF THE INVENTION

Figure 1:
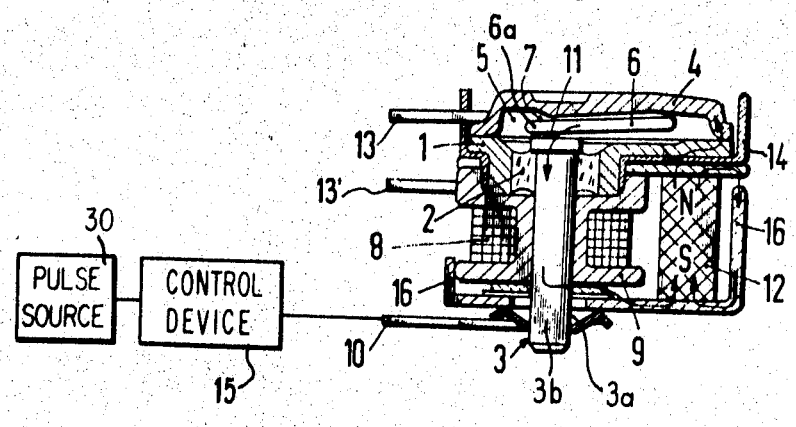
FIG. 1 is a sectional view of a preferred embodiment of the relay structure of this invention.

FIG. 1 shows, in sectional view, a preferred embodiment of the invention comprising a relay structure. Support plate 1 is supported by relay structure housing 14. Core 3 comprises a magnetizable material such as iron, and is fixedly supported and positioned within a complementary bore in support plate 1 by means of fused glassed section 2, which fills the gap between the periphery of core 3 and support plate 1. Lid 4 is joined with support plate 1 to form hermetically sealed chamber 5. Conventional glass fusing methods may be used to effect this seal. Chamber 5 is preferably air-evacuated, and is filled with an inert gas, which functions to increase the life of the movable relay structure elements contained therein.

A magnetizable armature 6 is supported by a leaf spring 7, which is fixedly mounted to lid 4. This type of structure is conventional in the prior art. Coil support 9 is supported by housing 14, and comprises a bore through which core 3 extends. Further, coil support 9 defines a recessed area in which coil 8 is wound. A source of exciter control pulses (not shown) is provided, with associated control apparatus to effect energization of exciter winding 8 as desired, to effect actuation of armature 6 to the desired position. In this regard, armature 6 may assume one of two positions, depending upon the net magnetic field developed across air gap 11 within chamber 5, by the magnetic circuitry to be described hereinafter. The two positions are (1) the rest position, and (2) the actuated position.

In the rest position, armature 6 is forced by leaf spring 7, to a position of substantial alignment with lid 4. However, development of the proper magnetic field across air gap 11, that is, a magnetic field of correct polarization and sufficient strength, causes end 6a of armature 6 to be actuated and moved to contact core 3. This is the actuated position of the relay structure described.

Yoke 16 of magnetizable material is connected to the relay housing structure and serves to complete the magnetic path between magnetic core 3 and permanent magnet 12. Further, it functions to shield the magnetic circuit, from outside magnetic influences. It is not essential that permanent magnet 12 be utilized. When it is used, it serves to pre-excite magnetic core 3. Permanent magnet 12 is not of sufficient strength to initiate actuation of armataure 6, in the absence of energization of exciter windings 8. However, it functions as a hold magnet when armature 6 is actuated.

Connection elements 10 and 10' (the latter terminal is not shown in the drawings, but is a conventional current return terminal comprise the input terminals to exciter winding 8. Connection elements 13 and 13' are connected between armature 6 and core 3, respectively. When the armature is actuated to the second position in which end 6a of armature 6 contacts core 3, a completed connection is effected between input terminals 13 and 13'. The relay structure may thus be utilized to complete the electrical connection circuit of elements connected between terminals 13 and 13'.

If a current pulse is fed from a conventional pulse source 30 to input terminals 10 and 10' of exciter winding 8, a magnetic field is developed that is polarized additively to the magnetic field produced by permanent magnet 12. Further, the current pulse is effective for a distinct and predetermined period of time which is less than the actual reaction time of the relay structure system (the time it takes to actuate armature 6).

Winding 8 is wound such that the electromagnetic field produced by the current pulse is polarized additively to the magnetic field of permanent magnet 12 and functions to produce a net combined magnetic field across air gap 11. The net magnetic field functions to initiate movement of the armature toward core 3, counter to the inherent inertia thereof.

Simultaneously, the current flowing in exciter winding 8 produces eddy currents in core 3. Control device 15 effects disconnection of the current source 30 that feeds the energization pulse to input terminals 10 and 10' of exciter winding 8. The eddy currents induced in core 3 tend to oppose any change in the magnetic field produced by exciter winding 8, and therefore tend to maintain the electromagnetic field. In this regard, the eddy currents, of course, gradually decrease in amplitude, and hence the electromagnetic field will gradually decrease. However, the net magnetic field across air gap 11, resulting from the additive combination of the electromagnetic field and the magetic field produced by permanent magnet 12, is sufficient to complete actuation of armature 6.

It is thus seen that magnetic core 3 is dimensioned so that the eddy currents are of sufficient amplitude and time duration to ensure completion of the actuation of armature 6. Core 3 may comprise iron, or an iron ring 3a of magnetizable material, such as iron, that surrounds an inner stud (non-ferrous) core 3b.

It is not absolutely essential that the eddy currents remain effective until armature actuation is completed when a permanent magnet 12 is utilized. In the regard, the magentic energy stored in magnetic core 3 must be effective only until armature 6 has been actuated or moved towards core 3 to a point at which permanent magnet 12 produces a magnetic field of sufficient strength to complete armature actuation. Thus, the magnetic field essential to initiate armature actuation is relatively greater than the magnetic field needed to complete armature actuation. Therefore, the energization pulse is applied to the exciter winding to produce a magnetic field across air gap 11 that is sufficient to initiate actuation of armature 6. Then, the eddy currents in magnetic core 3 sufficiently maintains the electromagnetic field so that it, in combination with the magnetic field produced by permanent magnet 12, continues to actuate armature 6 towards core 3, until the critical actuation point is passed.

The critical actuation point is determined by the size of the various relay elements and the air gap, and other such physical criteria. Once this point has been passed, permanent magnet 12 is of sufficient magnetic strength to complete actuation of armature 6. In the embodiment of the invention wherein a permanent magnet is not utilized, the eddy current must be of sufficient amplitude and time duration to complete actuation of armature 6 upon deenergization of exciter winding 8.

Permanent magnet 12 also functions as a hold magnet to maintain armature 6 in the actuated position, and thus counters the force of leaf spring 7 which tends to return or reset the armature to the rest position. In the absence of permanent magnet 12 it is seen that armature 6 would contact core 3, for only a temporary period of time, depending upon the eddy currents induced in core 3. Thus when the eddy currents have decreased to an amplitude such that the electromagnetic field correspondingly decreases to the point where it applies a force to armature 6 that is less than the counterforce produced by leaf spring 7, the armature will be reset to the rest position.

If permanent magnet 12 is used, armature 6 is reset to the rest position upon the application of a control pulse of opposite polarity relative to the control pulse utilized to initiate actuation of armature 6 to the second (actuated position) to exciter winding 8. The reset control pulse produces a magnetic field of opposite polarity to that produced by permanent magnet 12, and therefore is additive to the force of leaf spring 7 which tends to reset the armature to the rest position. It is to be appreciated that the magnetic energy required to initiate armature actuation and movement towards core 3, decreases as the armature approaches core 3. This is because the air gap 11 therebetween, consequently decreases, and hence a net magnetic field of successively lesser strength is sufficient to continue armature actuation or movement.

In any inductive circuit, such as one containing a relay, the current does not rise immediately to its Ohm's Law value when the circuit is completed. As the current commences to rise, the increasing flux produced by the current cuts the turns of the coil and generates an E.M.F. in opposition to the applied voltage. The back E.M.F. is depenent upon the rate of change of current and, as the current rises, the B.E.M.F. decreases at a progressively lower rate. The current therefore rises in the manner illustrated in FIG. 3, graphs A–C.

Similar conditions exist when the energization pulse is disconnected. In this case, however, the decrease in current produces an inductive E.M.F. and, if there is a circuit provided, results in a prolongation of the energizing current.

Thus, other means may be utilized to cause actuation of the armature when the source of energization pulses is disconnected from exciter winding 8. For example, terminals 10 and 10' may be short circuited across all or a portion of exciter winding 8, when the source of energization pulse is disconnected by control means 15. The E.M.F. induced therein may thus prolong the energization pulse as explained above, the amplitude thereof depending upon the percentage of the exciter winding that is short circuited. This will consequently produce a net magnetic field of sufficient strength and correct polarity across air gap 11 to continue actuation of armature 6.

The source of energization pulses and exciter winding 8 may be connected in parallel with a diode. The diode should be poled so that it does not provide a short circuit path for the energization pulses, and does provide a complete electrical circuit for the E.M.F. induced upon disconnection of the source of energization pulses by the collapsing magnetic field that produces an electromagnetic field of a polarity such as to continue armature actuation.

Alternatively, core 3 may be provided with an auxiliary winding that is short circuited upon disconnection of the energization pulse. The auxiliary winding is wound such that the electromagnetic field produced by the energization pulse is magnetically coupled to the auxiliary winding. Upon disconnection of the source of energization pulses and short circuiting of the auxiliary winding, an E.M.F. is induced therein, which functions to produce a net magnetic field across air gap 11 that is polarized so as to continue armature actuation.

Figure 3:
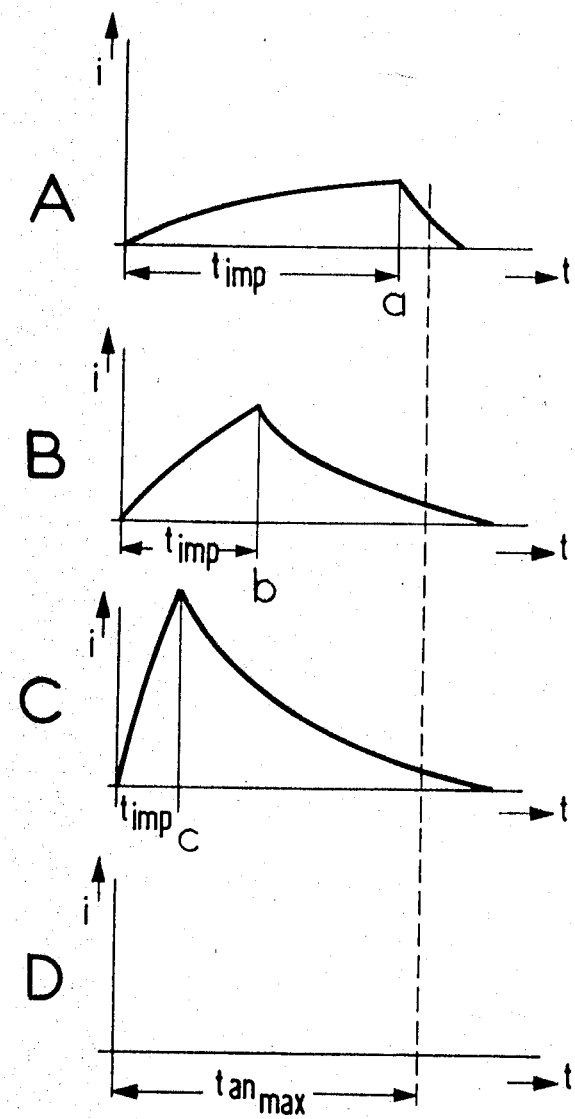
FIG. 3 is a series of four graphs, illustrating the effect of varying the amplitude of the energization current and the time during which it is effected, in comparison to the reaction time of the relay structure system.

FIG. 3, graphs A, B, and C, show the effect of applying successively greater amplitude input pulses, for successively lesser periods of time. Points $a$, $b$, and $c$ of graphs A, B, and C, respectively, are indicative of the time at which the energization pulse source is disconnected from input terminals 10 and 10' by control device 15. The gradually decreasing portions of the respective curves illustrate the currents (such as eddy currents, or short circuit exciter currents) that are then effective to maintain the electromagnetic field to complete actuation of the armature. Curve D of FIG. 3, illustrates the maximum reaction time that the current conditions existing in graphs A–C must be operative to cause actuation of armature 6. It is seen that the combination of current conditions of graphs A, B, and C, all function to complete actuation of the armature 6. Thus, a multiplicity of combinations of different energization pulse amplitudes and time durations may be utilized, according to the teachings of this invention.

The arrangement illustrated in FIG. 1 provides a compact relay structure, in which the permanent magnet 12 is arranged substantially parallel to core 3, and armature 6 is positioned substantially parallel to carrier plate 1. The arrangement further provides for maximum utilization of the produced magnetic fields. Energization pulses of relatively short duration and in the magnitude range of microseconds may then be utilized.

Figure 2:
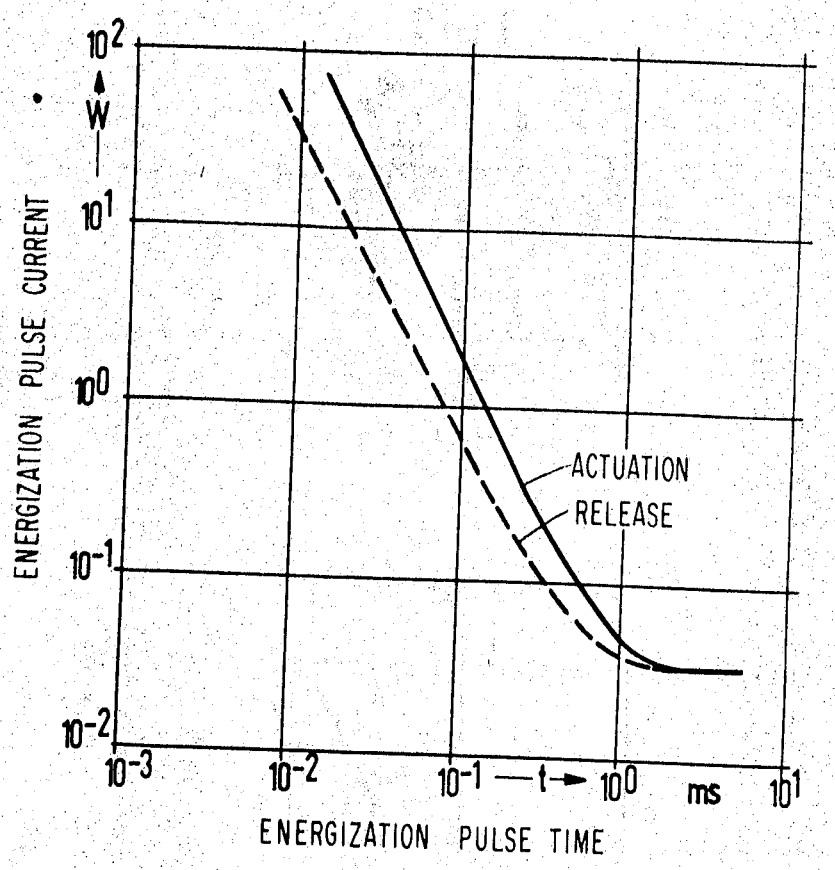
FIG. 2 is a graph illustrating the relationship between the amplitude of the energization current and the time interval during which it is effective, upon the actuation and release reaction times of the armature.

FIG. 2 illustrates a graph showing typical actuation (of armature 6 to the second or actuated position) and release (of armature 6 to the first or rest position) curves of the relay structure illustrated in FIG. 1, for a range of energization pulses. It is seen that the pulse time must be increased, as the pulse current amplitude decreases for both actuation and release of the armature. Further, the release function of the relay requires less pulse current and/or pulse time duration because leaf spring 7 functions to provide a force additive to the net magnetic field produced to release or reset the armature to the rest position.

It is apparent that the teachings of this invention apply also to the release of armature 6 from the second or actuated position by an energization pulse of opposite polarity relative to the energization pulse that actuates the armature thereto. Thus the source of release energization pulses is disconnected before armature release is effected, and/or the eddy currents induced in the core or the E.M.F. flowing in the short circuited exciter winding or the auxiliary winding, functions to continue armature release to completion.

What is claimed is:
1. A relay structure having an armature positioned in an air gap defined by operatively associated magnetic circuit elements and actuatable between a rest and an actuated position, depending upon the magnetic field produced across the air gap, comprising:
   a single soft iron core means,
   a source of energization pulses of time duration less than the mechanical actuation time of the armature between its positions,
   electromagnetic means selectively connectable to said source, the latter applying an energization pulse thereto which produces a magnetic field across said air gap to initiate actuation of the armature between its positions, and is further operative to induce currents in the core means to store sufficient magnetic energy therein to complete actuation of the armature between its positions upon termination of the applied energization pulse, said core means being dimensioned as to have produced therein said sufficient magnetic energy.

2. A relay structure as recited in claim 1 further comprising:
   a permanent magnet arranged to premagnetize the core means polarized to produce a magneic field additive to the magnetic field produced by the electromagnetic means.

3. A relay structure as recited in claim 2 wherein said core means comprises an iron outer ring and an inner stud core, and further comprising:
   support means supporting the core means, the electromagnetic winding being wound around the support means so as to enclose the core means,
   a permanent magnet arranged parallel to the core means to premagnetize the latter, polarized to produce a magnetic field additive to the magnetic field across the air gap,
   the armature being arranged substantially perpendicular to the core means and contacting one end of the latter in its actuated position 4. A relay structure as recited in claim 3, further comprising:
   a yoke magnetically coupling the other end of the core means and the armature.

References Cited
UNITED STATES PATENTS

| 2,992,306 | 7/1961 | Feiner | 335—63 |
| 3,253,095 | 5/1966 | Richert | 335—179 |
| 3,017,474 | 2/1960 | Huetten | 335—229 XR |
| 3,281,739 | 10/1966 | Greugg | 335—229 |

FOREIGN PATENTS

| 1,191,042 | 4/1965 | Germany. |
| 1,194,980 | 6/1965 | Germany. |

OTHER REFERENCES
"Time Relays" G. V. Druzbinin, Pergamon Press, London, 1961.

J D MILLER, Primary Examiner

C. L. YATES, Assistant Examiner

U.S. Cl. X.R.
335—181, 229